United States Patent
Boyer et al.

(10) Patent No.: US 10,410,228 B2
(45) Date of Patent: Sep. 10, 2019

(54) SYSTEM FOR AUTOMATIC RESPONSES TO PREDICTED TAIL EVENT OUTCOMES

(71) Applicant: Bank of America Corporation, Charlotte, NC (US)

(72) Inventors: Carol Ann Boyer, Whitter, NC (US); Jeffrey Pierre Dell, Morgan Hill, CA (US)

(73) Assignee: Bank of America Corporation, Charlotte, NC (US)

( * ) Notice: Subject to any disclaimer, the term of this patent is extended or adjusted under 35 U.S.C. 154(b) by 592 days.

(21) Appl. No.: 15/184,728

(22) Filed: Jun. 16, 2016

(65) Prior Publication Data
US 2017/0364813 A1 Dec. 21, 2017

(51) Int. Cl.
*G06Q 30/02* (2012.01)
*G06Q 10/06* (2012.01)

(52) U.S. Cl.
CPC ..... *G06Q 30/0203* (2013.01); *G06Q 10/0637* (2013.01); *G06Q 30/0201* (2013.01); *G06Q 30/0202* (2013.01)

(58) Field of Classification Search
None
See application file for complete search history.

(56) References Cited

U.S. PATENT DOCUMENTS

| 7,509,491 B1* | 3/2009 | Wainner | H04L 9/0833 713/163 |
| 9,721,294 B1* | 8/2017 | Vakil | G06Q 40/00 |
| 2015/0242856 A1* | 8/2015 | Dhurandhar | G06Q 50/01 705/44 |

OTHER PUBLICATIONS

ReadyGov Crisis Communications Plan, last updated Nov. 5, 2012, retrieved from Internet <https://web.archive.org/web/20150601085109/http://www.ready.gov:80/print/340> at p. 1-5 (Year: 2012).*
Ferguson & Huston, What is a VPN?, Cisco Technical Report (1998) at pp. 1-5. (Year: 1998).*

* cited by examiner

*Primary Examiner* — Li Wu Chang
(74) *Attorney, Agent, or Firm* — Michael A. Springs; Moore & Van Allen PLLC; Peter B. Stewart

(57) ABSTRACT

Embodiments of the present invention provide a system for a managing entity to automatically provide alerts based on tail event analysis. The system may receive input data in real time from vendor data feeds, social media data feeds, and a tail event ledger. The system may then automatically populate surveys, transmit the surveys to responders, and receive survey results from the responders. The survey results may be transmitted to specialists that return a predicted tail event outcome. This predicted tail event outcome is then automatically transmitted to partners, or decision makers, that provide action steps for responding to the predicted tail event outcome. The system may then continuously monitor the input data, identify an indicator of an occurrence of the tail event, and then automatically transmit the action steps to appropriate parties.

18 Claims, 9 Drawing Sheets

SYSTEM FOR AUTOMATIC RESPONSES TO PREDICTED TAIL EVENT OUTCOMES

FIELD OF THE INVENTION

The present invention is generally directed to a system for monitoring multiple inputs to analyze and identify triggering events for predicted tail events and their outcomes, and to automate responsive actions to such tail events.

BACKGROUND

Tail events are rare or otherwise difficult to predict events that may produce profound outcomes affecting operations of an organization. Past tail events could have been predicted through in-depth analysis of historical data trends and other indicators of the likelihood of the tail event. Unfortunately, it is difficult to predict with certainty what type of tail event will occur, and when such a tail event would occur. It is possible, however, to prepare for multiple tail events, each at different potential future time points, by predetermining appropriate steps to address an occurrence of a tail event.

Therefore, a need exists for an automated network of systems, devices, and data feeds that is capable of efficiently predicting potential tail events, predicting potential tail event outcomes, determining appropriate action steps for responding to each predicted tail event, and automatically implementing such action steps when the associated tail event does occur.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for a monitoring entity to automatically provide alerts based on tail event analysis. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve receiving, in real time, input data comprising third party vendor data feeds, social media data, and tail event ledger data. The system may then identify, based on the received input data, a tail event and additionally identify, from the received input data, tail event data associated with the identified tail event. Furthermore, the system may populate, automatically, a survey based on the identified tail event and the identified tail event data and provide, automatically, the survey to a plurality of responders associated with the monitoring entity. Next, in some embodiments, the system receives survey results from the plurality of responders and provides, automatically, the survey results to a plurality of specialists associated with the monitoring entity, wherein the plurality of specialists are experts in tail event analysis. Additionally, the system may receive a predicted tail event outcome from the plurality of specialists and may then provide, automatically, the identified tail event data and the predicted tail event outcome to one or more partners, wherein each of the one or more partners comprise leaders of a department group of the monitoring entity, leaders of a third party entity associated with the predicted tail event outcome, or leaders of a government agency associated with the predicted tail event outcome.

In some embodiments of the system, the system may then receive an action from the one or more partners, wherein the action comprises steps for responding to the predicted tail event outcome. The system is then able to monitor the input data for indicators of an occurrence of the tail event and identify an indicator of an occurrence of the tail event. In response to identifying the indicator of the occurrence of the tail event, the system may transmit, automatically, the steps for responding to the predicted tail event outcome to the one or more partners.

Furthermore, some embodiments of providing, automatically, the survey to the plurality of responders associated with the monitoring entity further comprises establishing a secure electronic communication channel between the monitoring entity and computing devices of the plurality of responders. The system can then transmit, across the secure electronic communication channel, the survey to displays on user interfaces of each of the computing devices of the plurality of responders.

Similarly, some embodiments of providing, automatically, the survey results to the plurality of specialists associated with the monitoring entity further comprises establishing a secure electronic communication channel between the monitoring entity and computing devices of the plurality of specialists. The system can then transmit, across the secure electronic communication channel, the survey results and the identified tail event data to displays on user interfaces of each of the computing devices of the plurality of specialists.

Additionally, some embodiments of providing, automatically, the identified tail event data and the predicted tail event outcome to the one or more partners further comprises establishing a secure electronic communication channel between the monitoring entity and computing devices of the one or more partners. The system may then transmit, across the secure electronic communication channel, the predicted tail event outcome and the identified tail event data to displays on user interfaces of each of the computing devices of the one or more partners.

Finally, some embodiments of the system may comprise storing the predicted tail event outcome in a tail event ledger associated with the tail event ledger data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
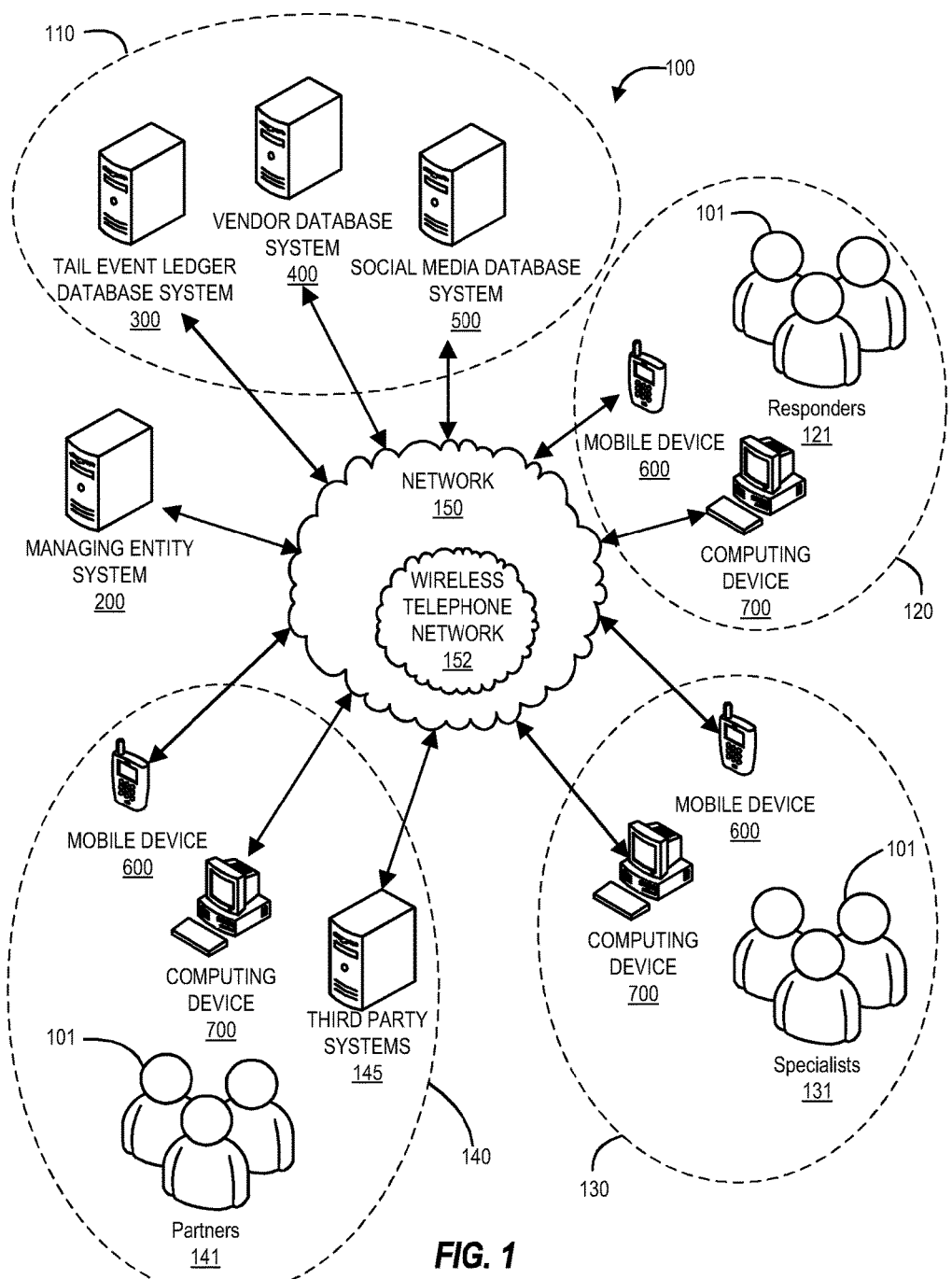
Figure 2:
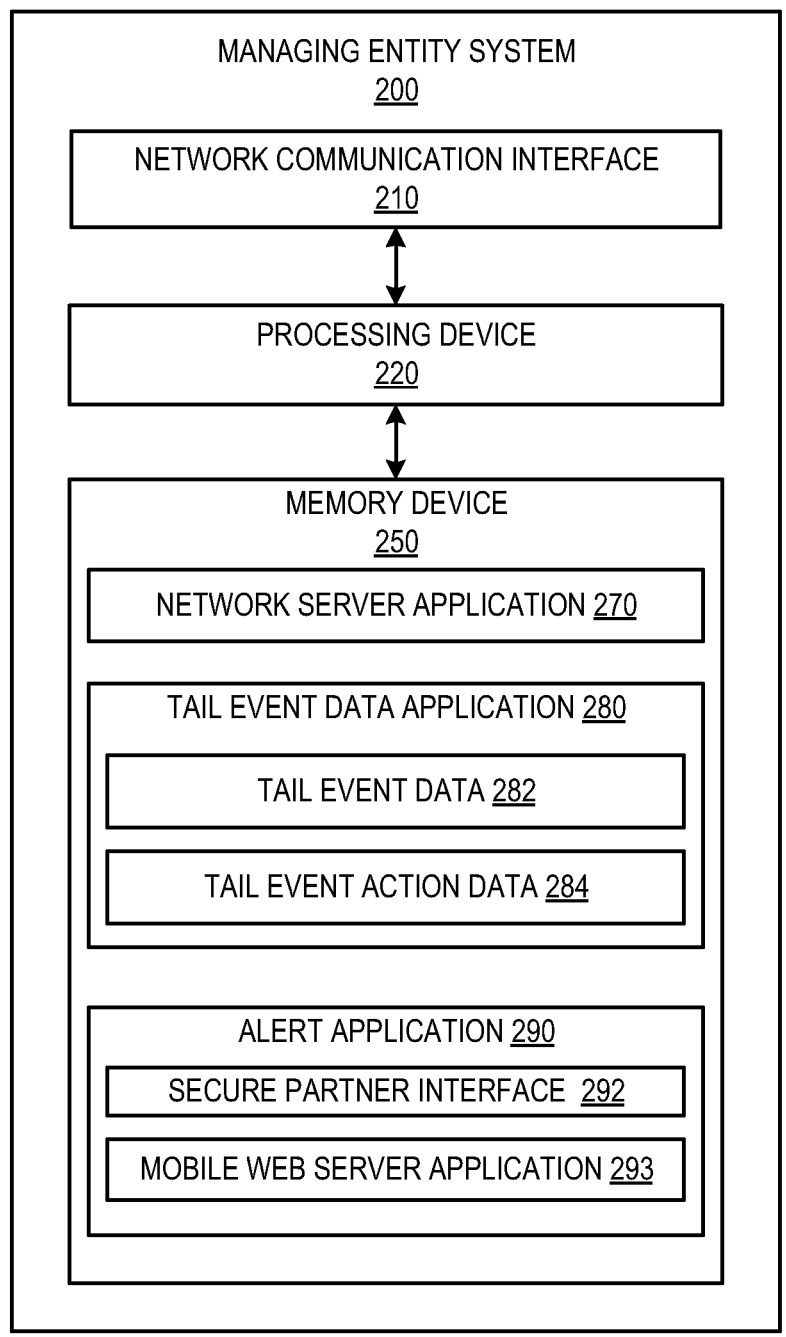
Figure 3:
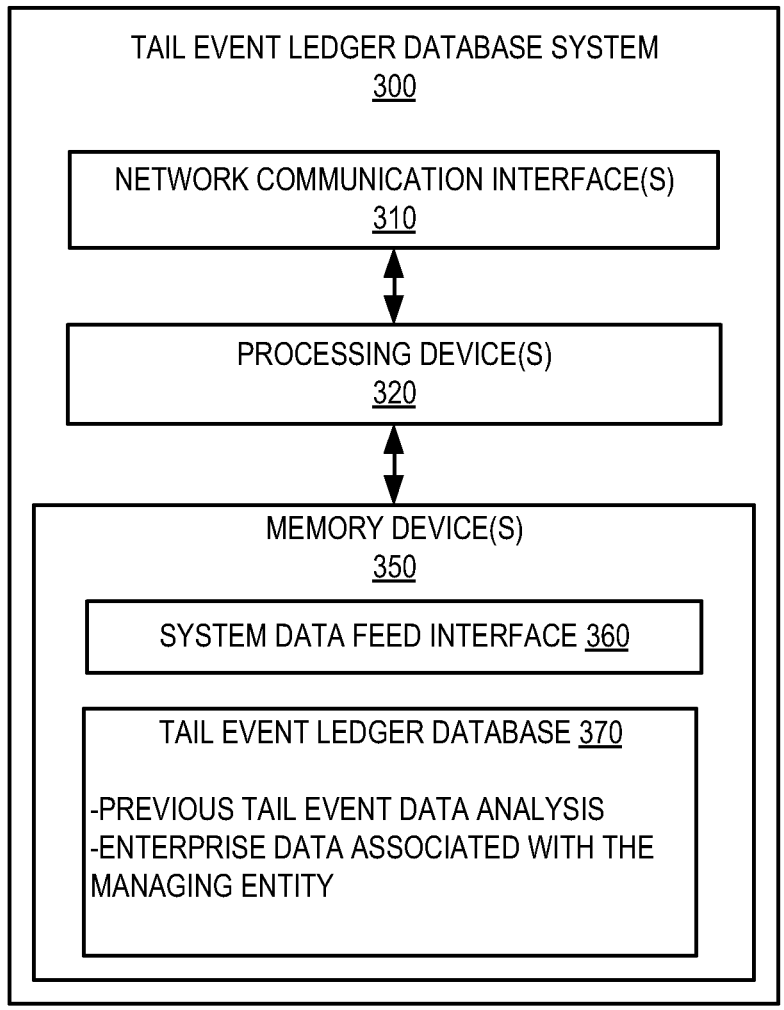
Figure 4:
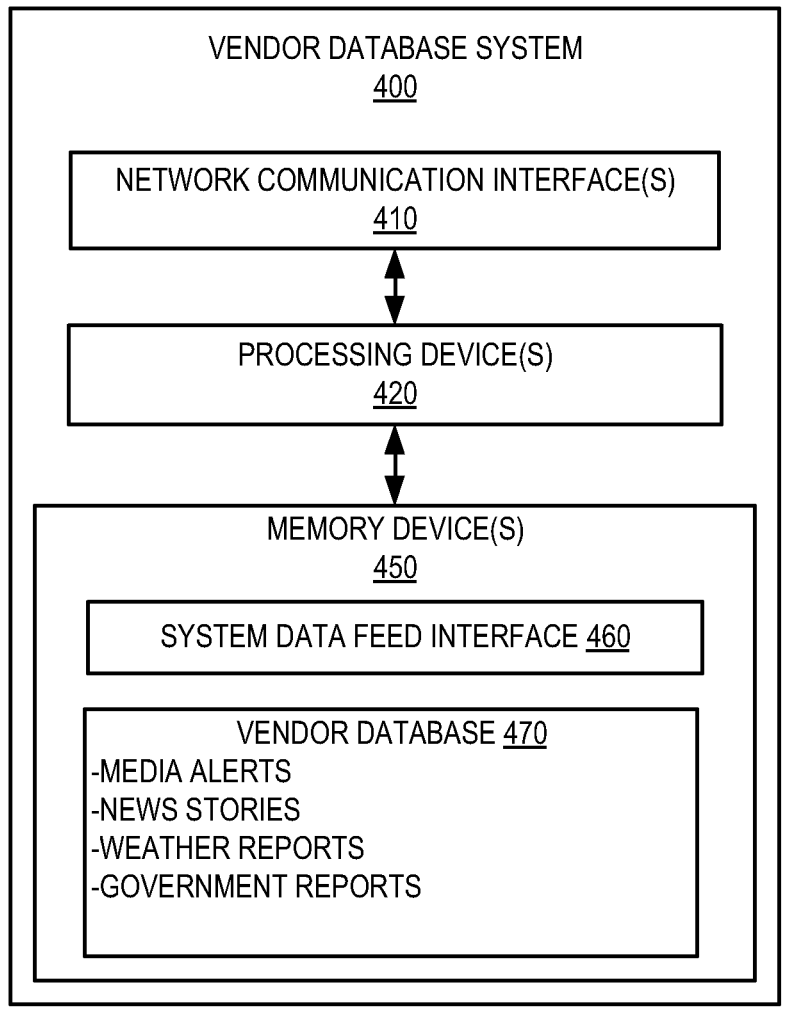
Figure 5:
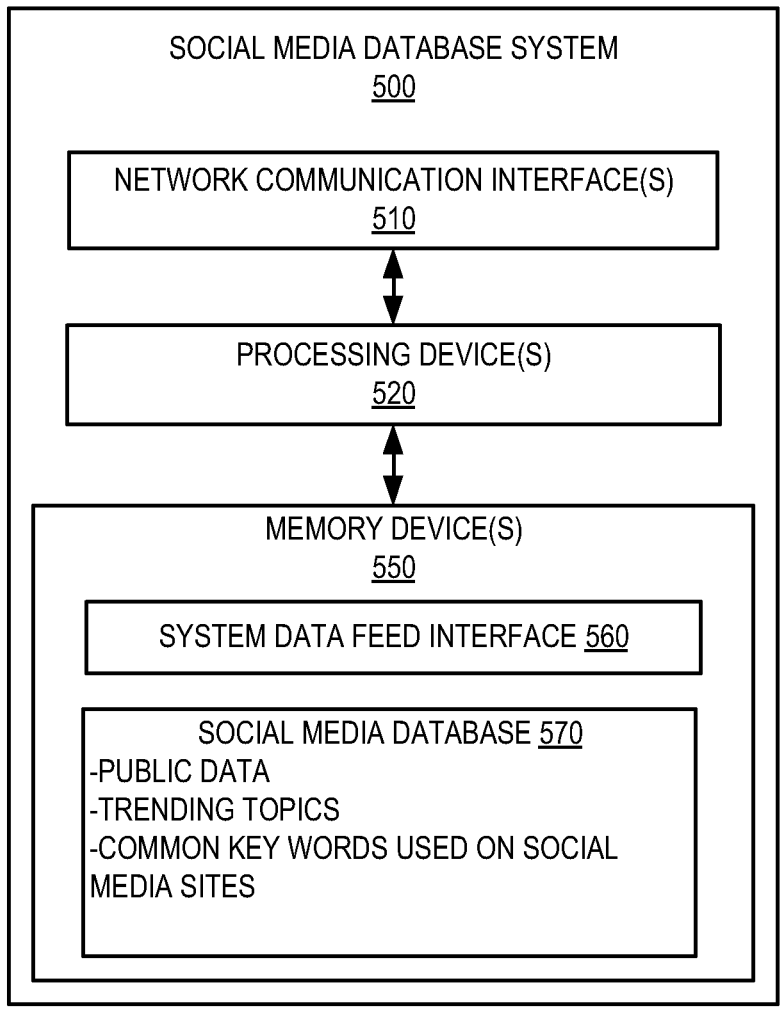
Figure 6:
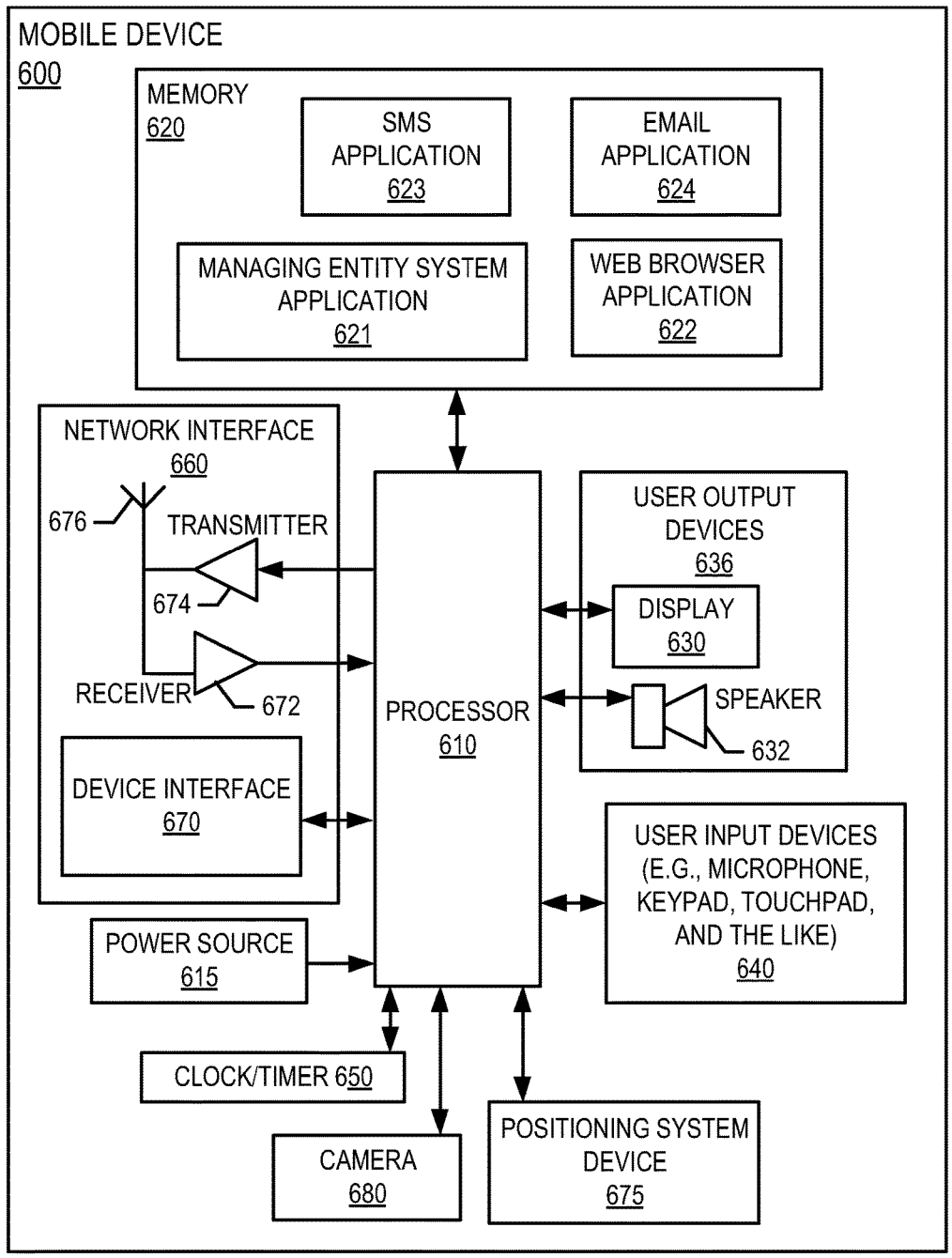
Figure 7:
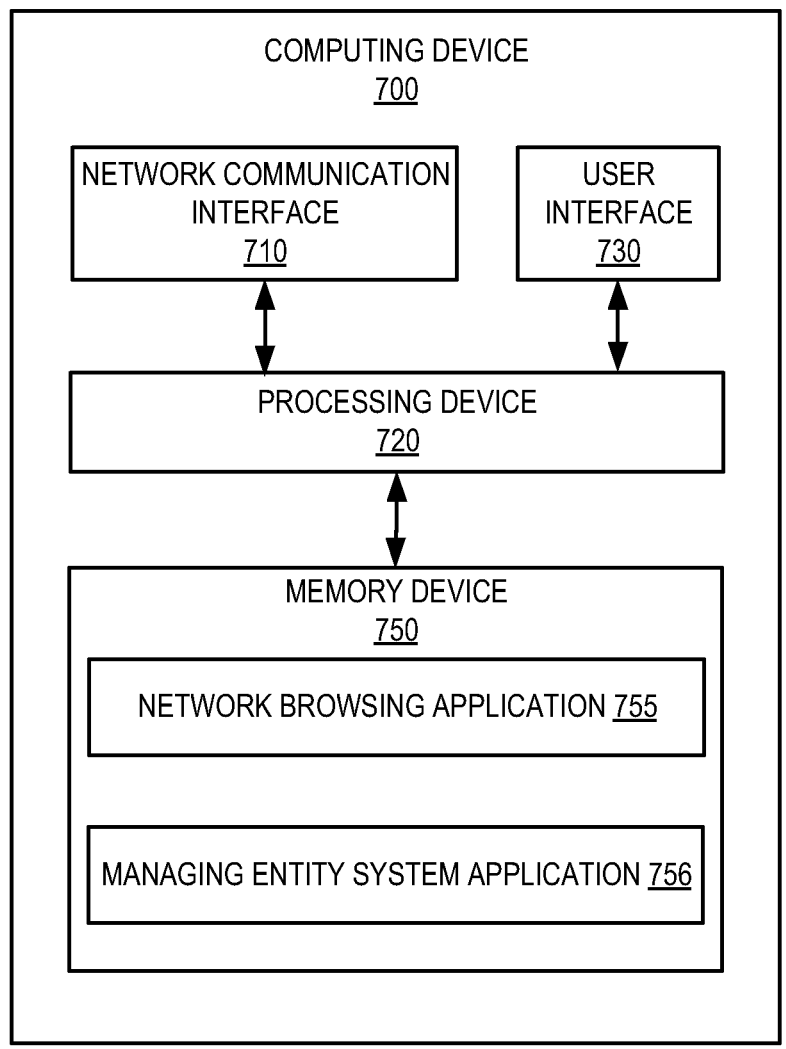
Figure 8A:
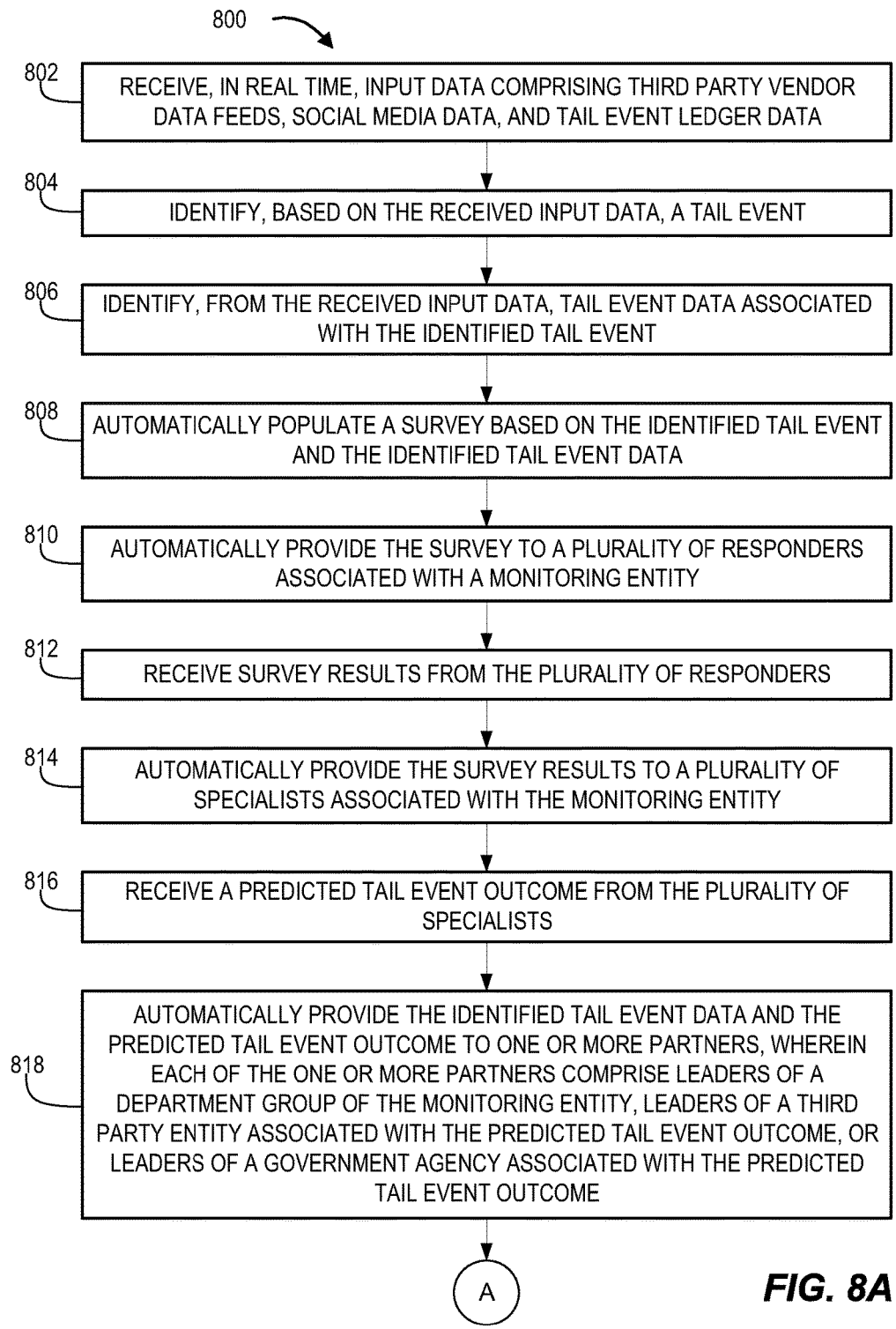
Figure 8B:
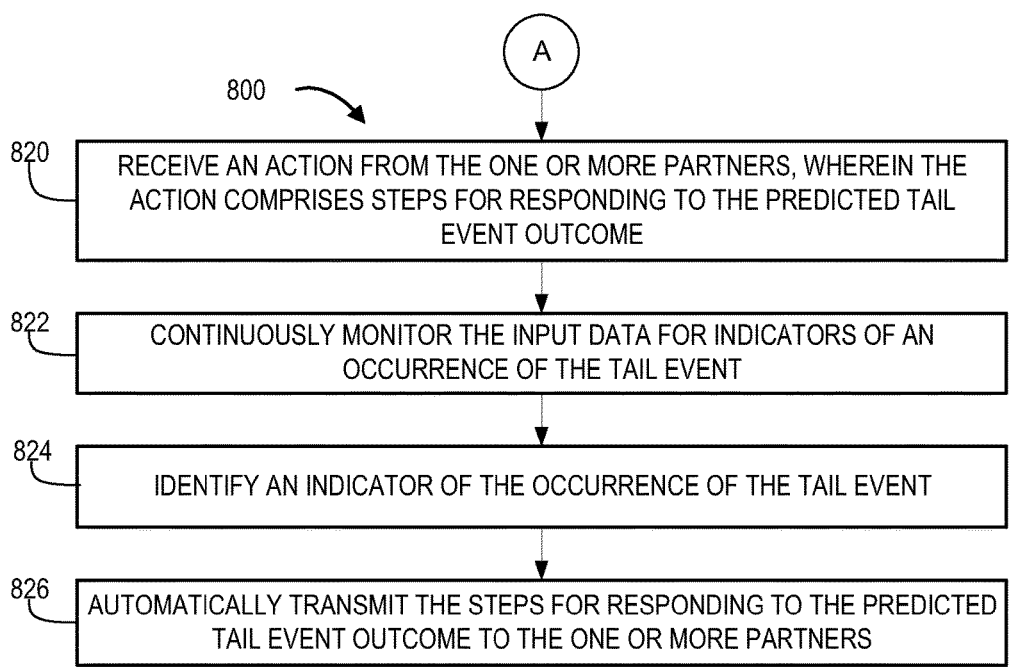

Having thus described embodiments of the invention in general terms, reference will now be made the accompanying drawings, wherein:

FIG. 1 provides a block diagram illustrating a system environment for a monitoring entity to automatically provide alerts based on tail event analysis, in accordance with an embodiment of the invention;

FIG. 2 provides a block diagram illustrating the managing entity system of FIG. 1, in accordance with an embodiment of the invention;

FIG. 3 provides a block diagram illustrating the tail event ledger database system of FIG. 1, in accordance with an embodiment of the invention;

FIG. 4 provides a block diagram illustrating the vendor database system of FIG. 1, in accordance with an embodiment of the invention;

FIG. 5 provides a block diagram illustrating the social media database system of FIG. 1, in accordance with an embodiment of the invention;

FIG. 6 is a diagram illustrating a mobile device of FIG. 1, in accordance with embodiments of the invention;

FIG. 7 is a diagram illustrating a computing device of FIG. 1, in accordance with embodiments of the invention; and FIGS. 8A and 8B provide a flowchart illustrating a process for a monitoring entity to automatically provide alerts based on tail event analysis, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "tail event" refers generally to rare or otherwise difficult to predict future events that likely will be associated with long term or consequential effects for a managing entity. Examples of tail events include, but are not limited to, natural events such as flooding and earthquakes, man-made events dealing with the economy, major power outages, major employment issues, and the like. The term "tail event outcome" refers to these consequential or long term effects of the tail event on the business operations of the managing entity. As the tail events are difficult themselves to predict, the tail event outcomes are especially difficult to determine and prepare for, without an in-depth and collaborative system for analyzing current data in real time. By processing many tail event scenarios, and predicting tail event outcomes associated with each tail event scenario, a managing entity can better prepare for the occurrence of a tail event in the future by setting alerts and providing predetermined steps for addressing each specific tail event.

The term "managing entity," as used herein, refers to an organization or other entity that controls the system for monitoring tail event data, communicating with various devices and systems associated with analyzing and addressing tail events and tail event outcomes, and setting certain tail event actions to be triggered upon an occurrence of a predicted tail event. In some embodiments, the managing entity is a financial institution, but the managing entity may also be any entity that could be affected by a tail event and the tail event outcomes. In accordance with embodiments of the invention, the terms "financial institution" and "financial entity" include any organization that processes financial transactions including, but not limited to, banks, credit unions, savings and loan associations, investment companies, stock brokerages, asses management firms, insurance companies and the like. In specific embodiments of the invention, use of the term "bank" is limited to a financial entity in which account-bearing customers conduct financial transactions, such as account deposits, withdrawals, transfers and the like.

Embodiments of the present invention provide a system and method for a managing entity to automatically provide alerts based on tail event analysis. The system may receive input data in real time from vendor data feeds, social media data feeds, and a tail event ledger. The system may then automatically populate surveys, transmit the surveys to responders, and receive survey results from the responders. The survey results may be transmitted to specialists that return a predicted tail event outcome. This predicted tail event outcome is then automatically transmitted to partners, or decision makers, that provide action steps for responding to the predicted tail event outcome. The system may then continuously monitor the input data, identify an indicator of an occurrence of the tail event, and then automatically transmit the action steps to appropriate parties.

FIG. 1 provides a block diagram illustrating a system and environment 100, in accordance with an embodiment of the invention. As illustrated in FIG. 1, the system environment 100 includes a managing entity system 200, a database system 110 comprising a tail event ledger database system 300, a vendor database system 400, and a social media database system 500, a responder system 120 comprising mobile devices 600, computing devices 700, and a plurality of responders 121 associated with one or more of the mobile devices 600 and computing devices. The system environment 100 also includes a specialist system 130 comprising mobile devices 600, computing devices 700, and a plurality of specialists 131 associated with one or more of the mobile devices and computing devices. Furthermore, the system environment 100 comprises a partner system 140 comprising mobile devices 600, computing devices 700, and partners 141 associated with one or more of the mobile devices 600 and computing devices 700.

As shown in the system environment 100, the managing entity system 200, the tail event ledger database system 300, the vendor database system 400, the social media database system 500, the mobile devices 600, and the computing devices 700 are communicably connected via the network 150, which in some instances may comprise a wireless telephone network 152.

The responders 121, the specialists 131, and the partners 141 are each individual users 101 in the system environment 100, and each associated with one or more mobile device 600 and computing device 700 that is in communication with one or more systems or devices through the network. As such, each user 101 may receive data, instructions, alerts, and the like, and may input data, responses, suggestions, authorizations, and the like via a user interface of the user's 101 mobile device 600 and/or computing device 700.

As used herein, the term "user" shall generally mean a person associated with the managing entity of the managing entity system 200. As such, a user 101 may be an employee, contractor, or other individual that conducts work for the managing entity. Additionally, a user 101 may be part of a third party's organization instead of the managing entity's organization. For example, a user 101 may be a manager of a government agency that collaborates with the managing entity for preparing for and/or addressing certain tail event outcome scenarios.

As used herein, a "mobile device" 600 is any mobile communication device, such as a cellular telecommunications device (i.e., a cell phone or mobile phone), personal digital assistant (PDA), a mobile Internet accessing device, or other mobile device. The mobile devices 600, and their capability to interact with users 101 and other devices in the system environment 100 will be discusses in greater detail with regard to FIG. 6. The computing devices 700, and their capability to interact with users 101 and other devices in the system environment 100 will be discussed in greater detail with regard to FIG. 7.

The mobile devices 600 and the computing devices 700 are configured to communicate over a network 150 with a managing entity system 200 and, in some cases, a tail event ledger database system 300, a vendor database system 400, a social media database system 500, other mobile devices 600, other computing devices 700, and/or third party systems 145. The managing entity system 200, the tail event ledger database system 300, the vendor database system 400, the social media database system 500, the mobile devices 600, and the computing devices 700 are each described in greater detail below with reference to FIGS. 2-7. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network 152.

The managing entity system 200 is in network communication with other devices to receive and/or extract data feeds associated with potential tail events at least from the tail event ledger database system 300, the vendor database system 400, and the social media database system 500. Additionally, the managing entity system 200 is capable of establishing secure electronic communication channels between itself, mobile devices 600, computing devices 700, and/or third party systems 145. As such, the managing entity system 200 is capable of transmitting instructions to these devices and systems to cause user interfaces of the mobile devices 600, computing devices 700 and third party systems 145 to display data, alerts, surveys, survey results, charts, and the like, so users 101 associated with the system environment 100 may receive and access data and information provided by the managing entity system 200. In some embodiments, the managing entity system 200 automatically establishes one or more secure electronic communication channels in response to a triggering event, like an identification of a tail event, and the like. Similarly, the mobile devices 600, the computing devices 700, and the third party systems 145 are configured such that user 101 inputs into the user interfaces may be communicated along the secure electronic communication channel to the managing entity system 200 and/or other devices within the system environment 100.

The third party systems 145 of the partner system 140 may be configured to be controlled and managed by one or more third-party partners (not shown in FIG. 1) over the network 150. In other embodiments, the third party systems 145 are controlled and managed by a different division of the same parent company as the managing entity. In some embodiments, the managing entity system 200 provides security controls that regulate which devices of the system environment 100 are accessible by the third party systems 145, and/or which data or data types are accessible by the third party systems 145. In this way, the managing entity system 200 can allow for a third party to collaborate with the managing entity, but only to the extent that the third party has legal authority and/or to the extent that the managing entity deems necessary for a beneficial collaborating partnership.

Similarly, each of the tail event ledger database system 300, the vendor database system 400, and the social media database system may be owned and controlled by the same entity that controls the managing entity system 200, or each may be controlled by one or more third parties. For example, a third party may provide a data feed associated with tail events that may affect the managing entity, and therefore this third party may have established a vendor database system 400 that the managing entity has included in its system environment 100. Additionally, the tail event ledger 300 may be a ledger maintained by the managing entity system 200, such that the managing entity system 200 can continuously update the tail event ledger based on tail event analysis that is discussed in greater detail with regard to FIGS. 8A and 8B.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 250. In certain embodiments, the managing entity system 200 is operated by a first entity, such as a financial institution, while in other embodiments, the managing entity system 200 is operated by an entity other than a financial institution.

It should be understood that the memory device 250 may include one or more databases or other data structures/repositories. The memory device 250 also includes computer-executable program code that instructs the processing device 220 to operate the network communication interface 210 to perform certain communication functions of the managing entity system 200 described herein. For example, in one embodiment of the managing entity system 200, the memory device 250 includes, but is not limited to, a network server application 270, a tail event data application 280 which includes tail event data 282 and tail event action data 284, an alert application 290 which includes a secure partner interface 492, a mobile web server application 293, and other computer-executable instructions or other data. The computer-executable program code of the network server application 270 or the alert application 290 may instruct the processing device 220 to perform certain logic, data-processing, and data-storing functions of the managing entity system 200 described herein, as well as communication functions of the managing entity system 200.

Furthermore, as used herein, a "memory device" (e.g., memory device 250, memory device 350, memory device 450, and memory device 550) generally refers to a device or combination of devices that store one or more forms of computer-readable media and/or computer-executable program code/instructions. Computer-readable media is defined in greater detail below. For example, in one embodiment, the memory device 250 includes any computer memory that provides an actual or virtual space to temporarily or permanently store data and/or commands provided to the processing device 220 when it carries out its functions described herein.

In some embodiments, previous tail event analysis data, enterprise data, media alerts, news stories, weather reports, government reports, third-party vendor reports, public data, trending topics, common key words from social media sites, and the like may be stored in a non-volatile memory in the memory devices 250, 350, 450, and/or 550, distinct from instructions for executing one or more process steps discussed herein that may be stored in a volatile memory such as a memory directly connected or directly in communication with a processing device executing the instructions. In this regard, some or all the process steps carried out by the processing devices 220, 320, 420, or 520 may be executed in real-time or near-real-time, thereby increasing the efficiency by which the processing device 220, 320, 420, and/or 520 may execute the instructions as compared to a situation where one or more of the instructions are stored and executed from a non-volatile memory, which may require greater access time than a directly connected volatile memory source. In some embodiments, one or more of the instructions are stored in a non-volatile memory and are accessed and temporarily stored (i.e., buffered) in a volatile memory directly connected with the processing device where they are executed by the processing device. Thus, in various embodiments discussed herein, the memory or memory device of a system or device may refer to one or more non-volatile memory devices and/or one or more volatile memory devices.

In one embodiment, the tail event data application 280 includes tail event data 282 and tail event action data 284. The network server application 270 and the alert application 290 are configured to invoke or use the tail event action data 284, the tail event data 282, and the secure partner interface 292 when communicating through the network communication interface 210 with mobile devices 600 and/or computing devices 700 of the users 101, namely the responders 121, the specialists 131, and the partners 141.

As used herein, a "communication interface" generally includes a modem, server, transceiver, and/or other device for communicating with other devices on a network, and/or a user interface for communicating with one or more customers. Referring again to FIG. 1, the network communication interface 210 is a communication interface having one or more communication devices configured to communicate with one or more other devices on the network 150, such as the tail event ledger database system 300, the vendor database system 400, the social media database system 500, one or more of the mobile devices 600, one or more of the computing devices 700, the third party systems 145, and the like. The processing device 220 is configured to use the network communication interface 210 to transmit and/or receive data and/or commands to and/or from the other devices connected to the network 150.

FIG. 3 provides a block diagram illustrating a tail event ledger database system 300, in accordance with embodiments of the invention. As illustrated in FIG. 3, the tail event ledger database system 300 generally includes, but is not limited to, a network communication interface 310, one or more processing devices 320, and one or more memory devices 350. The processing device 320 is operatively coupled to the network communication interface 310 and the memory device 350. In one embodiment of the tail event ledger database system 300, the memory device 350 stores, but is not limited to, a system data feed interface 360 and tail event ledger database 370. In some embodiments, the tail event ledger database 370 is a data repository that stores data including, but not limited to, previous tail event analysis details, enterprise data associated with the managing entity, and the like. In one embodiment of the invention, both the system data feed interface 360 and the tail event ledger database 370 may associate with applications having computer-executable program code that instructs the processing device 320 to operate the network communication interface 310 to perform certain communication functions involving the tail event ledger database 370 described herein. In one embodiment, the computer-executable program code of an application associated with the tail event ledger database 370 may also instruct the processing device 320 to perform certain logic, data processing, and data storing functions of the application associated with the tail event ledger database 370 described herein.

The network communication interface 310 is a communication interface having one or more communication devices configured to communicate with one or more other devices on the network 150. The processing device 320 is configured to use the network communication interface 310 to receive information from and/or provide information and commands to mobile devices 600, computing devices 700, third party systems 145, the managing entity system 200 and/or other devices via the network 150. In some embodiments, the processing device 320 also uses the network communication interface 310 to access other devices on the network 150, such as one or more web servers of one or more third-party data providers. In some embodiments, one or more of the devices described herein may be operated by a second entity so that the second entity controls the various functions involving the tail event ledger database system 300. For example, in one embodiment of the invention, although the managing entity system 200 is operated by a first entity (e.g., a financial institution), a second entity operates the tail event ledger database system 300 that stores received data in the tail event ledger database 370.

Previously analyzed tail events, and their predicted outcomes may be stored in the tail event ledger database system 300, and additional features can be applied to aid in the monitoring of the tail events. For example, a status report can be created and continuously maintained in real time that gives a status update for each tail event under certain assumptions, using red (urgent, major issues), yellow (tail events trending towards becoming major issues, minor issues), or green (no threat identified).

As described above, the processing device 320 is configured to use the network communication interface 310 to gather data, such as data associated with tail events of the managing entity that can be stored in the tail event ledger database 370 from various data sources. The processing device 320 stores the data that it receives in the tail event ledger database 370 within the memory device 350. The system data feed interface 360 may either continuously transmit data from the tail event ledger database 370 to the managing entity system 200, or the system data feed interface 360 may be configured to be continuously accessible by the managing entity system such that data from the tail event ledger database 370 may be continuously accessed, extracted, and/or analyzed.

FIG. 4 provides a block diagram illustrating a vendor database system 400, in accordance with embodiments of the invention. As illustrated in FIG. 4, the vendor database system 400 generally includes, but is not limited to, a network communication interface 410, one or more processing devices 420, and one or more memory devices 450. The processing device 420 is operatively coupled to the network communication interface 410 and the memory device 450. In one embodiment of the vendor database system 400, the memory device 450 stores, but is not limited to, a system data feed interface 460 and vendor database 470. In some embodiments, the vendor database 470 stores data including, but not limited to, media alerts, major news stories, weather reports, seismic reports, government reports, and the like. In one embodiment of the invention, both the system data feed interface 460 and the vendor database 470 may associate with applications having computer-executable program code that instructs the processing device 420 to operate the network communication interface 410 to perform certain communication functions involving the vendor database 470 described herein. In one embodiment, the computer-executable program code of an application associated with the vendor database 470 may also instruct the processing device 420 to perform certain logic, data processing, and data storing functions of the application associated with the vendor database 470 described herein.

The network communication interface 410 is a communication interface having one or more communication devices configured to communicate with one or more other devices on the network 150. The processing device 420 is configured to use the network communication interface 410 to receive information from and/or provide information and commands to mobile devices 600, computing devices 700, third party systems 145, the managing entity system 200 and/or other devices via the network 150. In some embodiments, the processing device 420 also uses the network communication interface 410 to access other devices on the network 150, such as one or more web servers of one or more third-party data providers. In some embodiments, one or more of the devices described herein may be operated by a third party entity so that the third party entity controls the various functions involving the vendor database system 400. For example, in one embodiment of the invention, although the managing entity system 200 is operated by a first entity (e.g., a financial institution), and a second entity operates the vendor database system 400 that stores received data in the vendor database 470. In some embodiments, multiple third party entities each control one or more vendor database systems 400, such that multiple third party vendor data feeds are available to the managing entity system 200.

As described above, the processing device 420 is configured to use the network communication interface 410 to gather data, such as data associated with tail events of the managing entity that can be stored in the vendor database 470 from various data sources. The processing device 420 stores the data that it receives in the vendor database 470 within the memory device 450. The system data feed interface 460 may either continuously transmit data from the vendor database 470 to the managing entity system 200, or the system data feed interface 460 may be configured to be continuously accessible by the managing entity system such that data from the vendor database 470 may be continuously accessed, extracted, and/or analyzed.

FIG. 5 provides a block diagram illustrating a social media database system 500, in accordance with embodiments of the invention. As illustrated in FIG. 5, the social media database system 500 generally includes, but is not limited to, a network communication interface 510, one or more processing devices 520, and one or more memory devices 550. The processing device 520 is operatively coupled to the network communication interface 510 and the memory device 550. In one embodiment of the social media database system 500, the memory device 550 stores, but is not limited to, a system data feed interface 560 and social media database 570. In some embodiments, the social media database 570 stores data including, but not limited to public data, trending topics, common key words used on social media sites, and the like. In one embodiment of the invention, both the system data feed interface 560 and the social media database 570 may associate with applications having computer-executable program code that instructs the processing device 520 to operate the network communication interface 510 to perform certain communication functions involving the social media database 570 described herein. In one embodiment, the computer-executable program code of an application associated with the social media database 570 may also instruct the processing device 520 to perform certain logic, data processing, and data storing functions of the application associated with the social media database 570 described herein.

The network communication interface 510 is a communication interface having one or more communication devices configured to communicate with one or more other devices on the network 150. The processing device 520 is configured to use the network communication interface 510 to receive information from and/or provide information and commands to mobile devices 600, computing devices 700, third party systems 145, the managing entity system 200 and/or other devices via the network 150. In some embodiments, the processing device 520 also uses the network communication interface 510 to access other devices on the network 150, such as one or more web servers of one or more third-party data providers. In some embodiments, one or more of the devices described herein may be operated by a second entity so that the second entity controls the various functions involving the social media database system 500. For example, in one embodiment of the invention, although the managing entity system 200 is operated by a first entity (e.g., a financial institution), a second entity operates the social media database system 500 that stores received data in the social media database 570.

As described above, the processing device 520 is configured to use the network communication interface 510 to gather data, such as data associated with tail events of the managing entity that can be stored in the social media database 570 from various data sources. The processing device 520 stores the data that it receives in the social media database 570 within the memory device 550. The system data feed interface 560 may either continuously transmit data from the social media database 570 to the managing entity system 200, or the system data feed interface 560 may be configured to be continuously accessible by the managing entity system such that data from the social media database 570 may be continuously accessed, extracted, and/or analyzed.

FIG. 6 provides a block diagram illustrating a user's 101 mobile device 600 of FIG. 1 in more detail, in accordance with embodiments of the invention. As described above, multiple mobile devices 600 may be used within the system environment 100, where each mobile device 600 is associated with one or more of the users 101, namely one or more of the responders 121, the specialists 131, and/or the partners 141. In portions of this application, a single mobile device 600 is mentioned or described, but it should be known that multiple mobile devices 600 are contemplated, with each mobile device 600 having at least a portion of the embodiments described herein. In one embodiment of the invention, the mobile device 600 is a mobile telephone. However, it should be understood that a mobile telephone is merely illustrative of one type of mobile device 600 that may benefit from, employ, or otherwise be involved with embodiments of the present invention and, therefore, should not be taken to limit the scope of embodiments of the present invention. Other types of mobile devices 600 may include portable digital assistants (PDAs), pagers, mobile televisions, gaming devices, laptop computers, cameras, video recorders, audio/video player, radio, GPS devices, or any combination of the aforementioned.

Some embodiments of the mobile device 600 include a processor 610 communicably coupled to such devices as a memory 620, user output devices 636, user input devices 640, a network interface 660, a power source 615, a clock or other timer 650, a camera 680, and a positioning system device 675. The processor 610, and other processors described herein, generally include circuitry for implementing communication and/or logic functions of the mobile device 600. For example, the processor 610 may include a digital signal processor device, a microprocessor device, and various analog to digital converters, digital to analog converters, and/or other support circuits. Control and signal processing functions of the mobile device 600 are allocated between these devices according to their respective capabilities. The processor 610 thus may also include the functionality to encode and interleave messages and data prior to modulation and transmission. The processor 610 can additionally include an internal data modem. Further, the processor 610 may include functionality to operate one or more software programs, which may be stored in the memory 620. For example, the processor 610 may be capable of operating a connectivity program, such as a web browser application 622. The web browser application 622 may then allow the mobile device 600 to transmit and receive web content, such as, for example, location-based content and/or other web page content, according to a Wireless Application Protocol (WAP), Hypertext Transfer Protocol (HTTP), and/or the like.

The processor 610 is configured to use the network interface 660 to communicate with one or more other devices on the network 150. In this regard, the network interface 660 includes an antenna 676 operatively coupled to a transmitter 674 and a receiver 672 (together a "transceiver"). The processor 610 is configured to provide signals to and receive signals from the transmitter 674 and receiver 672, respectively. The signals may include signaling information in accordance with the air interface standard of the applicable cellular system of the wireless telephone network 152. In this regard, the mobile device 600 may be configured to operate with one or more air interface standards, communication protocols, modulation types, and access types. By way of illustration, the mobile device 600 may be configured to operate in accordance with any of a number of first, second, third, and/or fourth-generation communication protocols and/or the like. For example, the mobile device 600 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 600 may also be configured to operate in accordance with non-cellular communication mechanisms, such as via a wireless local area network (WLAN) or other communication/data networks.

The network interface 660 may also include a device interface 670. The device interface 670 may include software, such as encryption software, and hardware, such as a modem, for communicating information to and/or from one or more systems or devices on a network 150 and connected with or that are part of the managing entity systems 200. For example, the mobile device 600 may be configured so that it can be used as an interface for interacting with computing devices 700, the managing entity system 200, and/or third party systems 145. For example, the mobile device 600 may wirelessly communicate encrypted survey results, tail event actions, and other information to a terminal of the network 150 or the managing entity system 200.

As described above, the mobile device 600 has a user interface that is, like other user interfaces described herein, made up of user output devices 636 and/or user input devices 640. The user output devices 636 include a display 630 (e.g., a liquid crystal display or the like) and a speaker 632 or other audio device, which are operatively coupled to the processor 610. The user input devices 640, which allow the mobile device 600 to receive data from a user 101 such as the responders 121, the specialists 131, and the partners 141, may include any of a number of devices allowing the mobile device 600 to receive data from the user 101, such as a keypad, keyboard, touch-screen, touchpad, microphone, mouse, joystick, other pointer device, button, soft key, and/or other input device(s). The user interface may also include a camera 680, such as a digital camera.

The mobile device 600 may also include a positioning system device 675 that is configured to be used by a positioning system to determine a location of the mobile device 600. For example, the positioning system device 675 may include a GPS transceiver. In some embodiments, the positioning system device 675 is at least partially made up of the antenna 676, transmitter 674, and receiver 672 described above. For example, in one embodiment, triangulation of cellular signals may be used to identify the approximate location of the mobile device 600. In other embodiments, the positioning system device 675 includes a proximity sensor or transmitter, such as an RFID tag, that can sense or be sensed by devices known to be located proximate a merchant or other location to determine that the mobile device 600 is located proximate these known devices.

The mobile device 600 further includes a power source 615, such as a battery, for powering various circuits and other devices that are used to operate the mobile device 600. Embodiments of the mobile device 600 may also include a clock or other timer 650 configured to determine and, in some cases, communicate actual or relative time to the processor 610 or one or more other devices.

The mobile device 600 also includes a memory 620 operatively coupled to the processor 610. As used herein, memory includes any computer readable medium (as defined herein below) configured to store data, code, or other information. The memory 620 may include volatile memory, such as volatile Random Access Memory (RAM) including a cache area for the temporary storage of data. The memory 620 may also include non-volatile memory, which can be embedded and/or may be removable. The non-volatile memory can additionally or alternatively include an electrically erasable programmable read-only memory (EEPROM), flash memory or the like.

The memory 620 can store any of a number of applications which comprise computer-executable instructions/code executed by the processor 610 to implement the functions of the mobile device 600 and/or one or more of the process/method steps described herein. For example, the memory 620 may include such applications as a conventional web browser application 622 and/or a financial institution system application 621. These applications also typically provide a graphical user interface (GUI) on the display 630 that allows the user 101 to communicate with the mobile device 600, the managing entity system 200, and/or other devices or systems. In one embodiment of the invention, when the user 101 decides to utilize the managing entity system application 621 program, the user 101 downloads, is assigned, or otherwise obtains the managing entity system application 621 from the managing entity system 200, or from a distinct application server. In other embodiments of the invention, the user 101 interacts with the managing entity system 200, computing devices 700, and/or third party systems 145, via the web browser application 622 in addition to, or instead of, the managing entity system application 621.

The memory 620 can also store any of a number of pieces of information, and data, used by the mobile device 600 and the applications and devices that make up the mobile device 600 or are in communication with the mobile device 600 to implement the functions of the mobile device 600 and/or the other systems described herein. For example, the memory 620 may include such data as user authentication information, and the like.

Referring now to FIG. 7, the computing devices 700 associated with one or more of the users 101 (namely the responders 121, the specialists 131, and the partners 141) also include various features, such as a network communication interface 710, a processing device 720, a user interface 730, and a memory device 750. As described above, multiple computing devices 700 may be used within the system 100, where each computing device 700 is associated with one or more of the users 101, namely one or more of the responders 121, the specialists 131, and/or the partners 141. In portions of this application, a single computing device 700 is mentioned or described, but it should be known that multiple computing devices 700 are contemplated, with each computing device 700 having at least a portion of the embodiments described herein. The network communication interface 710 includes a device that allows the computing device 700 to communicate over the network 150 (shown in FIG. 1). In one embodiment of the invention, a network browsing application 755 provides for a user to establish network communication with a managing entity system 200, one or more mobile device such as the mobile devices 600 (shown in FIG. 1), and/or third party systems 145 for the purpose of transmitting data, user 101 input, and the like, in accordance with embodiments of the invention. Additionally, a managing entity system application 756 may present surveys, questionnaires, discussion topics, tail event data, a predicted tail event outcome, and the like, in accordance with embodiments of the invention.

As used herein, a "processing device," such as the processing device 720, generally refers to a device or combination of devices having circuitry used for implementing the communication and/or logic functions of a particular system. For example, a processing device 720 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 720 may further include functionality to operate one or more software programs based on computer-executable program code thereof, which may be stored in a memory. As the phrase is used herein, a processing device 720 may be "configured to" perform a certain function in a variety of ways, including, for example, by having one or more general-purpose circuits perform the function by executing particular computer-executable program code embodied in non-transitory computer-readable medium, and/or by having one or more application-specific circuits perform the function.

As used herein, a "user interface" 730 generally includes a plurality of interface devices and/or software that allow a customer (e.g., the user 101) to input commands and data to direct the processing device to execute instructions. For example, the user interface 730 presented in FIG. 7 may include a graphical user interface (GUI) or an interface to input computer-executable instructions that direct the processing device 720 to carry out specific functions. The user interface 730 employs certain input and output devices to input data received from a user 101 or output data to a user 101. These input and output devices may include a display, mouse, keyboard, button, touchpad, touch screen, microphone, speaker, LED, light, joystick, switch, buzzer, bell, and/or other customer input/output device for communicating with one or more users 101.

As used herein, a "memory device" 750 generally refers to a device or combination of devices that store one or more forms of computer-readable media for storing data and/or computer-executable program code/instructions. Computer-readable media is defined in greater detail below. For example, in one embodiment, the memory device 750 includes any computer memory that provides an actual or virtual space to temporarily or permanently store data and/or commands provided to the processing device 720 when it carries out its functions described herein.

Referring now to FIGS. 8A and 8B, a flowchart is provided to illustrate one embodiment of a process 800 for a monitoring entity to automatically provide alerts based on tail event analysis, in accordance with embodiments of the invention. In some embodiments, the process 800 may include block 802, where the system receives, in real time, input data comprising third party vendor data feeds, social media data, and tail event ledger data. The input data may be aggregated by a third party and made available to the system, or the managing entity may receive multiple data feeds and/or maintain up-to-date databases of input data.

The managing entity may maintain its own tail event ledger database system 300 that records and stores data regarding previously-analyzed tail events, their respective outcomes, enterprises affected by each analyzed tail event, estimated timelines for each analyzed tail event, and actions to be taken in the event each tail event begins to actually occur. The ledger maintained in the tail event ledger database system 300 may continuously be updated with tail event data as the system processes newly identified tail events. Additionally, algorithms may be put in place to manage each stored set of tail event data such that when an analysis has not been updated by the system in a predetermined period of time (e.g., one month, one year, five years, and the like), the system can either (a) automatically transmit an alert to a user 101 associated with the managing entity to process the tail event through the system again, or (b) automatically present the tail event to the managing entity system 200 without requiring human actions.

The system may receive a data feed from third party vendors via a vendor database system 400. The vendor database system 400 may maintain a feed of a single database's data, or it may be an aggregation of multiple databases managed by one or more third parties. For example, the vendor database system 400 may aggregate weather data for multiple geographical regions (e.g., major cities, locations of the managing entity's datacenters, and the like) along with stock market values, media alerts or major news stories, government agency alerts, and the like. In some embodiments, a third party vendor may format the input data of the data feed into a single data format that is easily accessed and analyzed by the system. In other embodiments, the vendor data may be in multiple formats, some of which are not easily accessed and analyzed by the system. For example, weather data may be received by the system in a spreadsheet format while major news stories are received in a general text or email format. The system may then extract relevant information from the major news story input using optical character recognition (OCR) or a different text or image recognition process, and populate a spreadsheet or other appropriate electronic document in a recognizable format for the analysis portions of the system. In some embodiments, the OCR process may be specific to media alerts, major news stories, or whichever data source the input data is received from.

The system may receive social media data as a data feed from a social media database system 500, or the system may have access to, and permission to extract data from, a social media database of the social media database system 500. In some embodiments, the social media database system 500 is part of the third party vendor database system 400. The social media data may be comprised of any public data, trending topics, common key words used on social media sites, and the like, which may either individually, or in combination with other input data, provide insight into when a tail event might occur and/or how people and/or industries could react to such a tail event.

In some cases, when the managing entity system 200 detects that new information or otherwise relevant information may be available at one or more of the database systems 300, 400, and 500, the managing entity system 200 automatically sends control signals that cause the managing entity system 200 to establish a dedicated communication channel between the managing entity system 200 and the one or more database systems 300, 400, and 500 that may have relevant new information. In some cases, the dedicated communication channel is optimized so that the information may be communicated more efficiently than is could be over a non-dedicated communication channel. For example, a non-dedicated communication channel may utilize insecure network connections or systems or may utilize unstable or noise-prone network connections or systems. Thus, when establishing a dedicated communication channel, the managing entity system 200 may optimize parameters of the dedicated communication channel such that the communication channel is less prone to interruption from security breach, other traffic, offline systems or the like. This may be done by, for example, designating certain systems on the network between the managing entity system 200 and the various database systems 300, 400, and 500, respectively, as low-functioning, medium-functioning, or high-functioning network systems/hubs/connections/channels (collectively referred to as network systems).

In various other embodiments, the number of categories of systems may be raised or lowered. For example, there may be five (5) distinct categories of systems. The various network systems may be categorized by one or more administrators and/or automatically based on one or more monitoring modules or applications running on the managing entity system 200 and/or the database systems 300, 400, and 500. Such a monitoring system may flag any abnormalities in network communication such as an unintended offline network system, a security breach of a network system, a network communication affected negatively by noise or interference (in some cases based on a predetermined threshold of interference or communication errors).

Thus, once various network systems are categorized, the database systems 300, 400, and 500, and/or the managing entity system 200 may optimize the dedicated communication channel by selecting appropriately categorized network systems for the communication channel. For example, the managing entity system 200 may establish a dedicated communication channel in order to receive information associated with high priority third party vendor reports (as indicated by a vendor database control system, for example, in its control signals to the managing entity system 200). Continuing the example, when establishing the dedicated communication channel, the managing entity system 200 may only select high-functioning network systems in order to ensure that the high priority information may be reliably communicated from the vendor database system 300 to the managing entity system 200. In another example, certain database systems 300, 400, and/or 500 are designated or categorized and always provided a dedicated (or non-dedicated) communication channel based on their respective categorization.

In some embodiments, the process 800 includes step 804, where the system identifies, based on the received input data, a tail event. In some embodiments, the system analyzes all of the input data in and automatically determines a most urgent or highest priority tail event based on the analyzed input data and known values of potentially affected enterprises associated with the managing entity. The system may accomplish this task by identifying key words or data that are known to have a likely effect on certain enterprises of the managing entity, and analyzing text or data associated with the key words. Additionally or alternatively, the system may determine that weather patterns or social media trending topics indicate a potential loss of power, operational strength, employee availability, or other resources due to potential but rare future or ongoing events. In some embodiments, the system monitors the received input data in real time, or in near-real time, for such key words, key data, data trends, data thresholds, and the like.

For example, if the system identifies a trend of extremely dry weather and high temperatures in a geographical area near a major data center of the managing entity, the system may determine a potential tail event of a wildfire interacting with the major data center. In another example, the system may identify a trend in seismic activity in a location near a geographical location in which the managing entity conducts business. The system can then predict a potential tail events of an earthquake or landslide at the geographical location at one or more time points in the future (e.g., within one year, in one year, within 5 years, within 10 years, and the like.) In another example, the system may identify a potential conflict in trade policies between countries associated with the managing entity based on the social media data and/or vendor data of media alerts or major news stories. Of course, these are merely examples of tail events and how they may be identified by the system, and other tail events and input data types are anticipated.

Additionally, in some embodiments, the process 800 includes block 806, where the system identifies, from the received input data, tail event data associated with the identified tail event. Once a tail event has been identified, the system will automatically search at least a portion of the received input data to identify data associated with the tail event. In some embodiments, the tail event data comprises the input data that was used by the system to reach the conclusion of a potential tail event. In some embodiments, the system extracts any data that is associated with the identified tail event based on key words such as a geographical location, time information, enterprise or department information associated with potentially affected enterprises or departments, related enterprises or departments, government information, and the like.

In some embodiments, the system populates a heat map, flow chart, spreadsheet, presentation, and the like, with the identified input data (hereinafter referred to as a "heat map" for simplicity). The heat map can present a comparison of aspects of the tail event (e.g., timing, location, affected departments or enterprises, strength of potential dangers from the tail event, and the like) such that an individual can determine where hotspots of risk are, and which input data will be most relevant to analyzing the tail event. This heat map can then be presented to one or more tail event managers or teams, who will then identify what data is actually associated with the tail event, and discards the data that is not associated with the tail event. In some embodiments, the system can receive input from the tail event managers or teams that instruct the system on which input data to extract and include as identified tail event data.

The process 800 may also include block 808, where the system automatically populates a survey based on the identified tail event and the identified tail event data. While departmental experts may be able to provide valued insight at a level much higher than a single, average employee or an employee of a different department, the input from many average employees, along with the experts, can provide a more holistic view of dangers and aspects of a tail event that are most important to manage. As more input is provided from sources with a wide variety of specialties and knowledge, a more comprehensive and robust outlook on the tail event and its potential consequences can be ascertained.

Therefore, the system will provide a survey to a wide variety of responders that are associated with the managing entity. In this way, the system uses crowdsourcing to utilize the vast knowledge-base of the managing entity's workforce to obtain feedback on how the tail event might affect known aspects of the managing entity's business. Crowdsourcing also allows the system to identify certain aspects of the managing entity's business that would not be obviously anticipated as being affected by the tail event.

To accomplish the crowdsourcing, the system must generate a survey with questions directed to the tail event, tail event data, affected enterprises, expected timelines, and the like, and how each of these would affect the managing entity, should the tail event actually occur. Therefore, the system may populate a survey with known tail event data. For example, the system may present the tail event, and ask questions like "if the tail event occurred in X number of years, how would this affect Y department?" Other examples of questions include "Based on the trend shown in this graph, how would Z department be affected if the trend continues," "What is the most pressing challenge associated with this tail event based on this news story: A," and the like.

In some embodiments, the system has a generic survey template for tail event surveys. In some embodiments, the system has multiple survey templates for certain aspects of the tail event analysis. For example, the system has a specific survey templates for certain types of tail events, specific survey templates for certain tail event data types (e.g., weather, news stories, social media, and the like), specific survey templates for certain timelines, and the like.

In some embodiments, the process 800 includes block 810, where the system automatically provides the survey to a plurality of responders associated with the monitoring entity. The act of completing the step of populating the survey may trigger an automatic prompt to the system to transmit the survey to one or more mobile devices 600 and/or computing devices 700 of responders 121. In some embodiments, the automatic prompt causes the system to establish an electronic communication channel between the managing entity system 200 and the one or more mobile devices 600 and/or the one or more computing devices 700 associated with the responders 121. The system may then automatically cause a display on a user interface of the mobile devices 600 and/or the computing devices 700 to display the survey to the responders 121. The user interfaces of the mobile devices 600 and/or the computing devices 700 may also receive inputs from the responders.

In some embodiments, the system only sends the populated survey to responders 121 that are associated with departments or enterprises of the managing entity that are likely affected by the identified tail event. In some embodiments, the system also sends the populated survey to responders 121 that are associated with departments or enterprises of the managing enterprise that are related to the affected departments or enterprises. In some embodiments, the system sends the populated survey to a wide variety of responders 121, does not require that the responders 121 are directly or indirectly associated with the likely affected departments or enterprises of the managing entity. In some embodiments, responders 121 of certain departments are given surveys in response to a triggering event associated with the certain departments of the responders. For example, if the system identifies tail event data that comprises a legal issue or a potential change in a law, the system is triggered to send the survey to one or more responders 121 that are associated with the legal department.

Additionally, in some embodiments, the process 800 includes block 812, where the system receives survey results from the plurality of responders 121. In some embodiments, the system has provided instructions to the one or more mobile devices 600 and/or computing devices 700 to cause them to automatically transmit the survey results back to the managing entity system 200 upon completion of the survey results.

The system may then extract, tabulate, compare, or otherwise aggregate the survey results from the entire set of responders 121 into charts, scores, common themes, or other manageable medium for understanding how the group of responders 121, as a whole, answered the survey questions.

In some embodiments, the process 800 may include block 814, where the system automatically provides the survey results to a plurality of specialists associated with the monitoring entity. These specialists 131 may be employees of the monitoring entity that are experts in tail event analysis. As described above, the survey results may be presented to the specialists 131 in a manageable medium such as a chart, a set of scores or ratings for each question, and the like. The plurality of specialists 131 may comprise a few to a few dozen individuals with an expertise in analyzing tail event data, and the specialists may be organized to promote a discussion of the tail event based on the tail event data and the received survey results.

The specialists 131 will then have enough information and resources to analyze the tail event as a group, debating aspects of the tail event and its consequences, such that the most vulnerable business departments or enterprises are identified, the expected timeline is narrowed down, third party partners (e.g., other businesses, organizations, government organizations, and the like that likely are affected by the tail event) are identified, root causes of the tail event are determined, residual risks of the managing entity are determined, strengths and weaknesses in current tail event response techniques are identified, likely severity of the tail event is identified, and the like. Generally, the purpose of the survey is to vet the identified tail event data with real-world analysis from a wide variety of viewpoints. The goal is to utilize the wisdom of the crowd when investigating the probability and potential exposures due to the tail event.

In some embodiments, the system applies a weighting algorithm to the survey results based on factors associated with each particular responder 121. For example, the responders 121 associated with vital business departments of the managing entity, with many years of experience, in a management role, and located in a geographical area associated with the tail event would be heavily weighted when compared to a less-experienced responders 121 that are located in geographical locations that are not near the geographical area associated with the tail event.

Automatically providing the survey results to the plurality of specialists 131 may comprise establishing a secure electronic communication channel between the monitoring entity system 200 and the mobile devices 600 and/or computing devices 700 of the specialists 131. In some embodiments, the system is triggered by the completion of aggregating the survey results to automatically transmit the survey results across the secure electronic communication channel. The system's transmission may also include instructions to cause the mobile devices 600 and/or the computing devices 700 to display the survey results and/or the tail event data on displays of user interfaces of the mobile devices 600 and/or computing devices 700.

Furthermore, the process 800 may include block 816, where the system receives a predicted tail event outcome from the plurality of specialists 131. The discussion and debates of the specialists 131 will boil down the vast amount of tail event data and data associated with the survey responses to be consolidated into a memo, chart, heat map, or other manageable medium for conveying a final predicted tail event outcome for the identified tail event. Of course, because the tail event is a hypothetical (although potential) event, certain assumptions will be made (e.g., timing, geographical location, severity, and the like). All of the assumptions and the identified vulnerabilities, strengths, and challenges will have been boiled down into a single tail event outcome by the specialists 131.

In some embodiments, the system automatically transmits the tail event outcome, and its known assumptions, to the tail event ledger database system 300, for record keeping and to aid in future identified tail events that are related in some aspect to the current tail event analysis.

The process 800 may also include block 818, where the system automatically provides the identified tail event outcome to one or more partners 141, where each of the one or more partners 141 comprise leaders of a department group of the monitoring entity, leaders of a third party entity associated with the predicted tail event outcome, or leaders of a government agency associated with the predicted tail event outcome.

In this manner, the system has taken a hypothetical tail event, analyzed how the tail event would affect the managing entity and third parties by escalating the tail event as a hypothetical occurrence through crowdsourcing responders 121, and a discussion of specialists 131. Now that the system has identified the strengths and weaknesses of the managing entity, the system can begin to address which measures need to be put in place to be better prepared for when the identified tail event actually occurs.

As such, when the system provides the predicted tail event outcome to the partners 141, the system is allowing the partners 141 to understand how a tail event would affect the business that they manage, and allows the partners to organize a strategy for better handling the tail event ahead of time.

In some embodiments, automatically providing the predicted tail event outcome to the partners 141 comprises establishing a secure electronic communication channel between the monitoring entity system 200 and one or more mobile devices 600 and/or computing device 700 associated with the partners 141, in response to the system receiving the predicted tail event outcome from the specialists 131. Additionally, the transmission may include instructions to cause the mobile devices 600 and/or the computing devices 700 of the partners 141 to display the predicted tail event outcome (e.g., a chart, table, graph, memo, letter, email, and the like, or a combination of the foregoing) on a display of a user interface of each of the mobile devices 600 and/or the computing devices 700 associated with the partners 141.

In some embodiments, the process 800 includes block 820, where the system receives an action from the one or more partners, wherein the action comprises steps for responding to the predicted tail event outcome. The user interfaces of the mobile devices 600 and/or the computing devices 700 of the partners 141 may receive input from the partners 141 regarding steps for addressing the identified tail event. Some of these steps may be immediately implemented, and therefore can be automatically triggered once the response is received. Other steps may be for when the tail event actually occurs. In such embodiments, the system may also receive contact information for individuals whose responsibility it will be to conduct each suggested action, such that the system can automatically contact said individual when the tail event actually occurs. Other steps can be automated by the system at the time the event occurs (e.g., buy or execute an option to purchase a lease of land or response vehicles).

Other suggested actions that may be received from the partners 141 include generally monitoring the challenges associated with the tail event, automatically re-analyzing the tail event through the system based on a change to one or more assumptions, setting a future or periodic tail event analysis review, and ordering a department to conduct a system test based on the identified tail event to confirm the analysis and identify any additional issues regarding the tail event, to name a few.

Additionally, in some embodiments, the process 800 includes block 822, where the system continuously monitors the input data for indicators of an occurrence of the tail event. The same input data from the tail event ledger system 300, the vendor database system 400, and the social media database system 500 can be continuously monitored by the system. Certain key words, data values, and the like that are associated with an imminent occurrence of the tail event can be stored as indicators in a memory of the system and compared to the monitored input data.

In some embodiments, the process 800 may include block 824, where the system identifies the indicator of the occurrence of the tail event. When a match between the indicator and a piece or aggregation of input data occurs, the process 800 continues to block 826, where the system automatically transmits the steps for responding to the predicted tail event outcome to the one or more partners 141. Of course, the alerts may also be set up to notify one or more other individuals that are not partners 141, and these individuals would be notified instead. Additionally, in some embodiments, the alerts or steps in response to the tail event are executed by the system itself. For example, the system may be triggered to automatically purchase securities, land, automobiles, transfer server duties to different server locations, change server protocols, and the like.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system, maintained by a monitoring entity, the system for automatically providing alerts based on real time monitoring of input data and tail event analysis, the system comprising:
    one or more memory devices; and
    one or more processing devices operatively coupled to the one or more memory devices, wherein the one or more processing devices are configured to execute computer-readable program code to:
        receive input data comprising third party vendor data feeds, social media data, and tail event ledger data;
        monitor, in real time, the received input data for key words, data trends, and data threshold values associated with one or more tail events;
        identify, based on the received and monitored input data, a tail event of the one or more tail events that will occur in the future;
        identify, from the received input data, tail event data associated with the identified tail event;
        determine one or more departments of the monitoring entity that would will be affected by the identified tail event if the identified tail event did occur in the future;
        populate, automatically, a survey based on the identified tail event and the identified tail event data;
        in response to populating the survey, transmit control signals configured to cause a responder system to:
            display the survey on computing devices of a plurality of individual responders associated with the responder system, wherein each of the plurality of individual responders are employees of the monitoring entity that are associated with the determined one or more departments of the monitoring entity that will be affected by the identified tail event if the identified tail event did occur in the future;
            receive, from the computing devices of the plurality of individual responders, input as survey results from the plurality of responders; and
            in response to receiving the survey results from the plurality of responders, automatically transmit the survey results to the system;
        receive the survey results from the responder system;
        in response to receiving the survey results from the responder system, transmit control signals configured to cause a specialist system to:
            display the survey results on computing devices of a plurality of specialists associated with the specialist system, wherein the plurality of specialists comprise a plurality of individuals that are experts in tail event analysis;
            receive, from the computing devices of the plurality of specialists, input as a predicted tail event outcome from the plurality of specialists; and
            in response to receiving the predicted tail event outcome from the plurality of specialists, automatically transmit the predicted tail event outcome to the system;
        receive the predicted tail event outcome from the specialist system;
        in response to receiving the predicted tail event outcome, transmit control signals configured to cause a partner system to display the identified tail event data and the predicted tail event outcome on computing devices of one or more partners associated with the partner system, wherein the one or more partners comprise one or more individuals that are leaders of a department group of the monitoring entity, leaders of a third party entity associated with the predicted tail event outcome, or leaders of a government agency associated with the predicted tail event outcome;
        in response to receiving the predicted tail event outcome, automatically update a continuously updated tail event ledger by storing the predicted tail event outcome and the survey results in the tail event ledger associated with the tail event ledger data; and
        automatically predict a new tail event outcome for a subsequent and newly identified tail event of the one or more tail events that will occur in the future based on the updated tail event ledger.

2. The system of claim 1, wherein the one or more processing devices are configured to execute the computer readable program code to:
    receive an action from the one or more partners, wherein the action comprises steps for responding to the predicted tail event outcome;
    monitor the input data in real time for indicators of an occurrence of the tail event;
    identify an indicator of an occurrence of the tail event; and
    in response to identifying the indicator of the occurrence of the tail event, transmit, automatically, the steps for responding to the predicted tail event outcome to the one or more partners.

3. The system of claim 1, wherein transmitting control signals configured to cause the responder system to display the survey to the plurality of responders associated with the responder system further comprises configuring the one or more processing devices to execute the computer readable program code to:
    establish a secure electronic communication channel between the monitoring entity and computing devices of the plurality of responders; and
    transmit, across the secure electronic communication channel, the survey to displays on user interfaces of each of the computing devices of the plurality of responders.

4. The system of claim 1, wherein transmitting control signals configured to cause the specialist system to display the survey results to the plurality of specialists further comprises configuring the one or more processing devices to execute the computer readable program code to:
- establish a secure electronic communication channel between the monitoring entity and computing devices of the plurality of specialists; and
- transmit, across the secure electronic communication channel, the survey results and the identified tail event data to displays on user interfaces of each of the computing devices of the plurality of specialists.

5. The system of claim 1, wherein transmitting control signals configured to cause the partner system to display the identified tail event data and the predicted tail event outcome to predicted tail event outcome to the one or more partners further comprises configuring the one or more processing devices to execute the computer readable program code to:
- establish a secure electronic communication channel between the monitoring entity and computing devices of the one or more partners; and
- transmit, across the secure electronic communication channel, the predicted tail event outcome and the identified tail event data to displays on user interfaces of each of the computing devices of the one or more partners.

6. The system of claim 1, wherein the one or more processing devices are configured to execute the computer readable program code to:
- store the predicted tail event outcome in a tail event ledger associated with the tail event ledger data.

7. A computer program product, maintained by a monitoring entity, the computer program product for automatically providing alerts based on real time monitoring of input data and tail event analysis, the computer program product comprising at least one non-transitory computer readable medium comprising computer readable instructions, the instructions comprising instructions for:
- receiving input data comprising third party vendor data feeds, social media data, and tail event ledger data;
- monitoring, in real time, the received input data for key words, data trends, and data threshold values associated with one or more tail events;
- identifying, based on the received and monitored input data, a tail event of the one or more tail events that will occur in the future;
- identifying, from the received input data, tail event data associated with the identified tail event;
- determining one or more departments of the monitoring entity that will be affected by the identified tail event if the identified tail event did occur in the future;
- populating, automatically, a survey based on the identified tail event and the identified tail event data;
- in response to populating the survey, transmitting control signals configured to cause a responder system to:
  - display the survey on computing devices of a plurality of individual responders associated with the responder system, wherein each of the plurality of individual responders are employees of the monitoring entity that are associated with the determined one or more departments of the monitoring entity that will be affected by the identified tail event if the identified tail event did occur in the future;
  - receive, from the computing devices of the plurality of individual responders, input as survey results from the plurality of responders; and
  - in response to receiving the survey results from the plurality of responders, automatically transmit the survey results to the system;
- receiving survey results from the responder system;
- in response to receiving the survey results from the responder system, transmitting control signals configured to cause a specialist system to:
  - display the survey results on computing devices of a plurality of specialists associated with the specialist system, wherein the plurality of specialists comprise a plurality of individuals that are experts in tail event analysis;
  - receive, from the computing devices of the plurality of specialists, input as a predicted tail event outcome from the plurality of specialists; and
  - in response to receiving the predicted tail event outcome from the plurality of specialists, automatically transmit the predicted tail event outcome to the system;
- receiving the predicted tail event outcome from the specialist system;
- in response to receiving the predicted tail event outcome, transmitting control signals configured to cause a partner system to display the identified tail event data and the predicted tail event outcome on computing devices of one or more partners associated with the partner system, wherein the one or more partners comprise leaders of a department group of the monitoring entity, leaders of a third party entity associated with the predicted tail event outcome, or leaders of a government agency associated with the predicted tail event outcome;
- in response to receiving the predicted tail event outcome, automatically updating a continuously updated tail event ledger by storing the predicted tail event outcome and the survey results in the tail event ledger associated with the tail event ledger data; and
- automatically predicting a new tail event outcome for a subsequent and newly identified tail event of the one or more tail events that will occur in the future based on the updated tail event ledger.

8. The computer program product of claim 7, wherein the computer readable instructions further comprise instructions for:
- receiving an action from the one or more partners, wherein the action comprises steps for responding to the predicted tail event outcome;
- monitoring the input data in real time for indicators of an occurrence of the tail event;
- identifying an indicator of an occurrence of the tail event; and
- in response to identifying the indicator of the occurrence of the tail event, transmitting, automatically, the steps for responding to the predicted tail event outcome to the one or more partners.

9. The computer program product of claim 7, wherein transmitting control signals configured to cause the responder system to display the survey to the plurality of responders associated with the responder system further comprises computer readable instructions for:
- establishing a secure electronic communication channel between the monitoring entity and computing devices of the plurality of responders; and
- transmitting, across the secure electronic communication channel, the survey to displays on user interfaces of each of the computing devices of the plurality of responders.

10. The computer program product of claim 7, wherein transmitting control signals configured to cause the specialist system to display the survey results to the plurality of specialists further comprises computer readable instructions for:

establishing a secure electronic communication channel between the monitoring entity and computing devices of the plurality of specialists; and transmitting, across the secure electronic communication channel, the survey results and the identified tail event data to displays on user interfaces of each of the computing devices of the plurality of specialists.

11. The computer program product of claim 7, wherein transmitting control signals configured to cause the partner system to display the identified tail event data and the predicted tail event outcome to predicted tail event outcome to the one or more partners further comprises computer readable instructions for:

establishing a secure electronic communication channel between the monitoring entity and computing devices of the one or more partners; and transmit, across the secure electronic communication channel, the predicted tail event outcome and the identified tail event data to displays on user interfaces of each of the computing devices of the one or more partners.

12. The computer program product of claim 7, wherein the computer readable instructions further comprise instructions for:

storing the predicted tail event outcome in a tail event ledger associated with the tail event ledger data.

13. A computer implemented method, maintained by a managing entity, the computer implemented method for providing alerts based on real time monitoring of input data and tail event analysis, said computer implemented method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving input data comprising third party vendor data feeds, social media data, and tail event ledger data;

monitoring, in real time, the received input data for key words, data trends, and data threshold values associated with one or more tail events;

identifying, based on the received and monitored input data, a tail event of the one or more tail events that will occur in the future;

identifying, from the received input data, tail event data associated with the identified tail event;

determining one or more departments of the monitoring entity will be affected by the identified tail event if the identified tail event did occur in the future;

populating, automatically, a survey based on the identified tail event and the identified tail event data;

in response to populating the survey, transmitting control signals configured to cause a responder system to:

display the survey on computing devices of a plurality of individual responders associated with the responder system, wherein each of the plurality of individual responders are employees of the monitoring entity that are associated with the determined one or more departments of the monitoring entity that will be affected by the identified tail event if the identified tail event did occur in the future;

receive, from the computing devices of the plurality of individual responders, input as survey results from the plurality of responders; and in response to receiving the survey results from the plurality of responders, automatically transmit the survey results to the system;

receiving survey results from the responder system;

in response to receiving the survey results from the responder system, transmitting control signals configured to cause a specialist system to:

display the survey results on computing devices of a plurality of specialists associated with the specialist system, wherein the plurality of specialists comprise a plurality of individuals that are experts in tail event analysis;

receive, from the computing devices of the plurality of specialists, input as a predicted tail event outcome from the plurality of specialists; and in response to receiving the predicted tail event outcome from the plurality of specialists, automatically transmit the predicted tail event outcome to the system;

receiving the predicted tail event outcome from the specialist system;

in response to receiving the predicted tail event outcome, transmitting control signals configured to cause a partner system to display the identified tail event data and the predicted tail event outcome on computing devices of one or more partners associated with the partner system, wherein the one or more partners comprise leaders of a department group of the monitoring entity, leaders of a third party entity associated with the predicted tail event outcome, or leaders of a government agency associated with the predicted tail event outcome;

in response to receiving the predicted tail event outcome, automatically updating a continuously updated tail event ledger by storing the predicted tail event outcome and the survey results in the tail event ledger associated with the tail event ledger data; and automatically predicting a new tail event outcome for a subsequent and newly identified tail event of the one or more tail events that will occur in the future based on the updated tail event ledger.

14. The computer implemented method of claim 13, wherein the computer implemented method further comprises:

receiving an action from the one or more partners, wherein the action comprises steps for responding to the predicted tail event outcome;

monitoring the input data in real time for indicators of an occurrence of the tail event;

identifying an indicator of an occurrence of the tail event; and in response to identifying the indicator of the occurrence of the tail event, transmitting, automatically, the steps for responding to the predicted tail event outcome to the one or more partners.

15. The computer implemented method of claim 13, wherein transmitting control signals configured to cause the responder system to display the survey to the plurality of responders associated with the responder system further comprises:

establishing a secure electronic communication channel between the monitoring entity and computing devices of the plurality of responders; and transmitting, across the secure electronic communication channel, the survey to displays on user interfaces of each of the computing devices of the plurality of responders.

16. The computer implemented method of claim 13, wherein transmitting control signals configured to cause the specialist system to display the survey results to the plurality of specialists further comprises:

establishing a secure electronic communication channel between the monitoring entity and computing devices of the plurality of specialists; and transmitting, across the secure electronic communication channel, the survey results and the identified tail event data to displays on user interfaces of each of the computing devices of the plurality of specialists.

17. The computer implemented method of claim 13, wherein transmitting control signals configured to cause the partner system to display the identified tail event data and the predicted tail event outcome to predicted tail event outcome to the one or more partners further comprises:

establishing a secure electronic communication channel between the monitoring entity and computing devices of the one or more partners; and transmit, across the secure electronic communication channel, the predicted tail event outcome and the identified tail event data to displays on user interfaces of each of the computing devices of the one or more partners.

18. The computer implemented method of claim 13, wherein the computer implemented method further comprises:

storing the predicted tail event outcome in a tail event ledger associated with the tail event ledger data.

* * * * *